US012643200B2

(12) United States Patent
Li et al.

(10) Patent No.: US 12,643,200 B2
(45) Date of Patent: Jun. 2, 2026

(54) METHOD OF MAKING A COATED ABRASIVE ARTICLE AND COATED ABRASIVE ARTICLE

(71) Applicant: 3M INNOVATIVE PROPERTIES COMPANY, St. Paul, MN (US)

(72) Inventors: Junting Li, Shanghai (CN); Yu Yang, Eden Prairie, MN (US); Jing Zhang, Minneapolis, MN (US); Michael J. Annen, Hudson, WI (US); Ernest L. Thurber, Somerset, WI (US); Eric W. Nelson, Stillwater, MN (US); Mark A. Lukowski, St. Paul, MN (US); Chunjie Zhang, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 525 days.

(21) Appl. No.: 18/250,294

(22) PCT Filed: Sep. 22, 2021

(86) PCT No.: PCT/IB2021/058659

§ 371 (c)(1),
(2) Date: Apr. 24, 2023

(87) PCT Pub. No.: WO2022/090821

PCT Pub. Date: May 5, 2022

(65) Prior Publication Data

US 2023/0405766 A1 Dec. 21, 2023

Related U.S. Application Data

(60) Provisional application No. 63/106,647, filed on Oct. 28, 2020.

(51) Int. Cl.

| | |
|---|---|
| ***B24D 11/00*** | (2006.01) |
| ***B24D 3/28*** | (2006.01) |
| ***B24D 3/34*** | (2006.01) |
| ***C08L 61/14*** | (2006.01) |
| ***C09K 3/14*** | (2006.01) |

(52) U.S. Cl.

CPC ............ *B24D 11/001* (2013.01); *B24D 3/285* (2013.01); *B24D 3/344* (2013.01); *C08L 61/14* (2013.01); *C09K 3/1409* (2013.01)

(58) Field of Classification Search

CPC ...... B24D 11/00; B24D 11/001; B24D 3/285; B24D 3/344; C08L 61/14; C09K 3/1409

See application file for complete search history.

(56) References Cited

U.S. PATENT DOCUMENTS

| | | | |
|---|---|---|---|
| 1,910,444 | A | 5/1933 | Nicholson |
| 3,041,156 | A | 6/1962 | Rowse et al. |
| 3,698,983 | A | 10/1972 | Bryant et al. |
| 3,787,224 | A | 1/1974 | Uffner |
| 4,035,961 | A | 7/1977 | Pemrick et al. |
| 4,134,869 | A | 1/1979 | Kalafus et al. |
| 4,282,011 | A | 8/1981 | Terpay |
| 4,314,827 | A | 2/1982 | Leitheiser et al. |
| 4,437,865 | A | 3/1984 | Parekh et al. |
| 4,588,419 | A | 5/1986 | Caul et al. |
| 4,623,364 | A | 11/1986 | Cottringer et al. |
| 4,648,843 | A | 3/1987 | Mitra |
| 4,652,275 | A | 3/1987 | Bloecher et al. |
| 4,690,692 | A | 9/1987 | Hesse et al. |
| 4,734,104 | A | 3/1988 | Broberg |
| 4,737,163 | A | 4/1988 | Larkey |
| 4,744,802 | A | 5/1988 | Schwabel |
| 4,751,138 | A | 6/1988 | Tumey et al. |
| 4,770,671 | A | 9/1988 | Monroe et al. |

(Continued)

FOREIGN PATENT DOCUMENTS

| | | | | |
|---|---|---|---|---|
| CN | 1568357 | | 1/2004 | |
| CN | 1628162 | | 6/2005 | |
| EP | 0776733 | B1 | 9/2002 | |
| EP | 1904577 | B1 | 10/2011 | |
| WO | 8602920 | A1 | 5/1986 | |
| WO | WO-2007002711 | A2 * | 1/2007 | ............ B24D 11/00 |
| WO | 2018106587 | A1 | 6/2018 | |
| WO | 2020075006 | A1 | 4/2020 | |

OTHER PUBLICATIONS

"Phenolic Resins", Kirk-Othmer, Encyclopedia Of Chemical Technology, Fourth Edition, John Wiley and Sons, 1996, vol. 18, pp. 603-644.

(Continued)

*Primary Examiner* — Pegah Parvini

(74) *Attorney, Agent, or Firm* — Kathleen B. Gross; Katherine M. Scholz; Bradford B. Wright

(57) ABSTRACT

A method of making a coated abrasive article includes disposing a precursor make layer on a major surface of the backing, optionally partially curing the precursor make layer to provide a partially cured precursor make layer, disposing abrasive particles; partially embedding abrasive particles in the optionally partially cured precursor make layer; and further curing the optionally partially cured precursor make layer to form a make layer. The precursor make layer comprises components comprising: a) 50 to 97.99 percent by weight of phenol-formaldehyde resin; b) 1 to 49 percent by weight of resorcinol-formaldehyde resin; c) 1 to 49 percent by weight of at least one compound having at least one free-radically polymerizable group; and d) 0.01 to 1 percent by weight of a free-radical initiator. A size layer and/or supersize layer may be disposed over the make layer and abrasive articles. Coated abrasive articles made by the method are also disclosed.

14 Claims, 1 Drawing Sheet

(56) References Cited

U.S. PATENT DOCUMENTS

| | | | |
|---|---|---|---|
| 4,799,939 A | | 1/1989 | Bloecher et al. |
| 4,881,951 A | | 11/1989 | Wood et al. |
| 4,997,461 A | | 3/1991 | Markhoff-Matheny et al. |
| 5,009,675 A | | 4/1991 | Kunz et al. |
| 5,011,508 A | | 4/1991 | Wald et al. |
| 5,042,991 A | | 8/1991 | Kunz et al. |
| 5,085,671 A | | 2/1992 | Martin et al. |
| 5,108,463 A | | 4/1992 | Buchanan |
| 5,137,542 A | | 8/1992 | Buchanan et al. |
| 5,152,917 A | | 10/1992 | Pieper et al. |
| 5,201,916 A | | 4/1993 | Berg et al. |
| 5,203,884 A | | 4/1993 | Buchanan et al. |
| 5,213,591 A | | 5/1993 | Celikkaya et al. |
| 5,256,170 A | | 10/1993 | Harmer et al. |
| 5,304,224 A | | 4/1994 | Harmon |
| 5,328,716 A | | 7/1994 | Buchanan |
| 5,344,688 A | | 9/1994 | Peterson et al. |
| 5,352,254 A | | 10/1994 | Celikkaya |
| 5,355,636 A | | 10/1994 | Harmon |
| 5,366,523 A | | 11/1994 | Rowenhorst et al. |
| 5,378,251 A | | 1/1995 | Culler et al. |
| 5,435,816 A | | 7/1995 | Spurgeon et al. |
| 5,436,063 A | | 7/1995 | Follett et al. |
| 5,486,219 A | | 1/1996 | Ford et al. |
| 5,496,386 A | | 3/1996 | Broberg et al. |
| 5,520,711 A | | 5/1996 | Helmin |
| 5,560,753 A | | 10/1996 | Schnabel et al. |
| 5,565,011 A | | 10/1996 | Follett et al. |
| 5,573,816 A | | 11/1996 | Gaeta et al. |
| 5,609,706 A | | 3/1997 | Benedict et al. |
| RE35,570 E | | 7/1997 | Rowenhorst et al. |
| 5,672,097 A | | 9/1997 | Hoopman |
| 5,700,302 A | | 12/1997 | Stoetzel |
| 5,946,991 A | | 9/1999 | Hoopman |
| 5,961,674 A | | 10/1999 | Gagliardi et al. |
| 5,975,987 A | | 11/1999 | Hoopman et al. |
| 5,975,988 A | | 11/1999 | Christianson |
| 5,984,988 A | | 11/1999 | Berg et al. |
| 6,077,601 A | * | 6/2000 | DeVoe .................. B24D 18/00 428/323 |
| 6,114,021 A | | 9/2000 | Pankratz et al. |
| 6,129,540 A | | 10/2000 | Hoopman et al. |
| 6,521,005 B1 | | 2/2003 | Vincent |
| 7,150,770 B2 | | 12/2006 | Keipert et al. |
| 7,364,800 B2 | | 4/2008 | Jesberger et al. |
| 8,034,137 B2 | | 10/2011 | Erickson et al. |
| 8,142,531 B2 | | 3/2012 | Adefris et al. |
| 8,142,532 B2 | | 3/2012 | Erickson et al. |
| 8,142,891 B2 | | 3/2012 | Culler et al. |
| 8,840,920 B2 | | 9/2014 | Nugara et al. |
| 8,940,063 B2 | | 1/2015 | Yang et al. |
| 9,085,838 B2 | | 7/2015 | Maldonado Arellano |
| 9,771,504 B2 | | 9/2017 | Adefris |
| 9,776,302 B2 | | 10/2017 | Keipert |
| 9,849,563 B2 | | 12/2017 | Thurber et al. |
| 10,150,336 B2 | | 12/2018 | Bruce et al. |
| 10,611,001 B2 | | 4/2020 | Culler et al. |
| 11,945,076 B2 | | 4/2024 | Koenig et al. |
| 2003/0232915 A1 | | 12/2003 | Corvasce |
| 2006/0194038 A1 | | 8/2006 | You et al. |
| 2008/0152856 A1 | | 6/2008 | Keipert et al. |
| 2009/0165394 A1 | | 7/2009 | Culler et al. |
| 2009/0169816 A1 | | 7/2009 | Erickson et al. |
| 2009/0325466 A1 | | 12/2009 | Kincaid et al. |
| 2012/0227333 A1 | | 9/2012 | Adefris et al. |
| 2013/0040537 A1 | | 2/2013 | Schwabel et al. |
| 2013/0125477 A1 | | 5/2013 | Adefris |
| 2019/0242042 A1 | | 8/2019 | Altshuler et al. |

OTHER PUBLICATIONS

International Search Report for PCT International Application No. PCT/IB2021/058659, mailed on Jan. 14, 2022, 4 pages.

* cited by examiner

METHOD OF MAKING A COATED ABRASIVE ARTICLE AND COATED ABRASIVE ARTICLE

CROSS REFERENCE TO RELATED APPLICATIONS

This application is a national stage filing under 35 U.S.C. 371 of PCT/IB2021/058659, filed Sep. 22, 2021, which claims the benefit of U.S. Provisional Application No. 63/106,647, filed Oct. 28, 2020, the disclosure of which is incorporated by reference in its/their entirety herein.

TECHNICAL FIELD

The present disclosure broadly relates to coated abrasive articles and methods of making and using the same.

BACKGROUND

In general, coated abrasive articles have an abrasive layer secured to a backing. The abrasive layer comprises abrasive particles and a binder that secures the abrasive particles to the backing. One type of coated abrasive article has an abrasive layer comprised of a make layer and abrasive particles. In making such a coated abrasive article, a precursor make layer comprising a curable precursor make layer is applied to a major surface of the backing. Abrasive particles are then at least partially embedded into the curable make resin (for example, via electrostatic coating), and the curable precursor make layer is at least sufficiently cured to adhere the abrasive particles to the backing. Often, a precursor size layer comprising a curable size resin is then applied over the at least partially cured curable make resin and abrasive particles, followed by curing of the curable size resin precursor, and optionally, further curing of the curable make resin. Some coated abrasive articles additionally have a supersize layer disposed over the make and/or size layers of the coated abrasive article. The supersize layer typically includes grinding aids and/or antiloading materials.

It is a common practice in the abrasive art to add UV-curable resins to phenolic precursor make layer formulations. Through UV irradiation prior to abrasive particle (hereinafter also referred to as "mineral") coating, the precursor make layer is partially gelled, so the mineral penetration into the precursor make layer can be well controlled, leading to improved mineral orientation.

This approach can have challenges with some lamps that emit significant amounts of thermal energy in addition to the UV light. Exposure to these light sources can cause the phenolic resin to cure/dry prematurely, especially on its exposed surface forming a skin. In such a case, mineral cannot be easily embedded into the precursor make layer if it even sticks at all.

SUMMARY

Advantageously and unexpectedly, methods of making coated abrasive articles according to the present disclosure can improve abrasive particle pick up and retention of orientation of the abrasive particles during electrostatic deposition of the abrasive particles.

In a first aspect the present disclosure provides a method of making a coated abrasive article comprising:

providing a backing having first and second opposed major surfaces disposing a precursor make layer on the first major surface of the backing, wherein the precursor make layer comprises an at least partially cured reaction product of components comprising:

a) 50 to 97.99 percent by weight of phenol-formaldehyde resin;

b) 1 to 49 percent by weight of resorcinol-formaldehyde resin;

c) 1 to 49 percent by weight of at least one compound having at least one free-radically polymerizable group;

d) 0.01 to 1 percent by weight of a free-radical initiator; and e) optional filler, wherein the percent by weight of the components a) to d) is based on the combined weight of the components a) to d); and optionally partially curing the precursor make layer to provide a partially cured precursor make layer; and partially embedding abrasive particles in the optionally partially cured precursor make layer; and further curing the optionally partially cured precursor make layer to provide a further cured precursor make layer.

In a second aspect the present disclosure provides coated abrasive articles made according to the method of the present disclosure.

As used herein:

"(meth)acryl" refers methacryl and/or acryl groups (i.e., 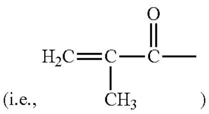 ) and/or 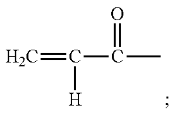 ;

and

"weight percent" and percent by weight" are interchangeable.

Features and advantages of the present disclosure will be further understood upon consideration of the detailed description as well as the appended claims.

It should be understood that numerous other modifications and embodiments can be devised by those skilled in the art, which fall within the scope and spirit of the principles of the disclosure. The figures may not be drawn to scale.

DETAILED DESCRIPTION

Figure 1:
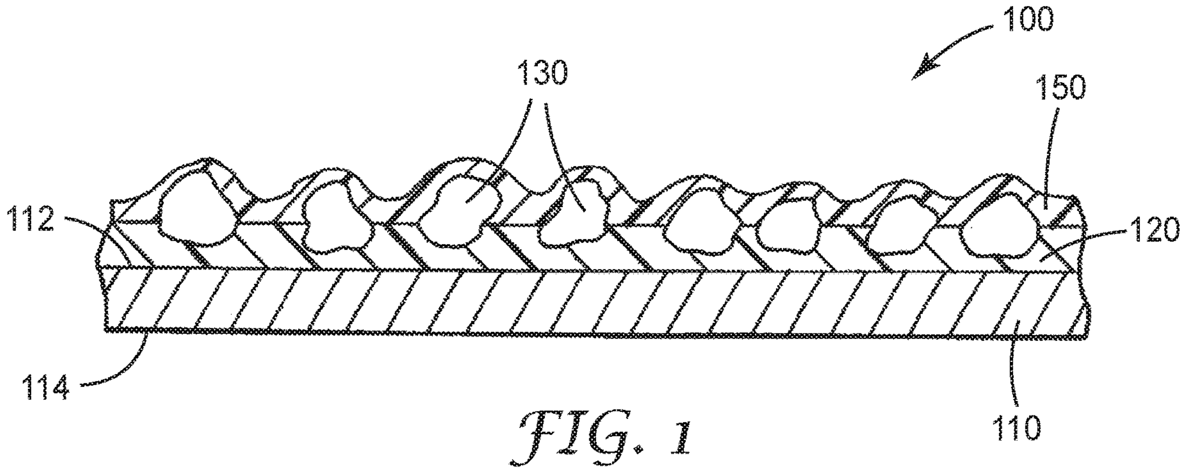
FIG. 1 is a schematic side view of an exemplary abrasive article 100 made according one method of the present disclosure.

FIG. 1 shows an exemplary abrasive article that can be prepared according embodiments of the present disclosure. Coated abrasive article 100 comprises backing 110 having first and second opposed major surfaces 112, 114 and make layer 120 disposed on first major surface 112. Abrasive particles 130 are partially embedded in and secured to make layer 120. Optional supersize layer 150 is disposed on make layer 120 and abrasive particles 130.

Coated abrasive articles as shown in FIG. 1 can be made according to the method described herein below.

In a first step, a backing is provided. The backing has first and second opposed major surfaces. Useful backings include, for example, those known in the art for making coated abrasive articles. Typically, the backing has two opposed major surfaces, although this is not a requirement. The thickness of the backing generally ranges from about 0.02 to about 5 millimeters, desirably from about 0.05 to about 2.5 millimeters, and more desirably from about 0.1 to about 1.0 millimeter, although thicknesses outside of these ranges may also be useful. Generally, the strength of the backing should be sufficient to resist tearing or other damage during abrading processes. The thickness and smoothness of the backing should also be suitable to provide the desired thickness and smoothness of the coated abrasive article; for example, depending on the intended application or use of the coated abrasive article.

Exemplary backings include: dense nonwoven fabrics (e.g., needletacked, meltspun, spunbonded, hydroentangled, or meltblown nonwoven fabrics), meshes, knitted fabrics, stitchbonded and/or woven fabrics; scrims; polymer films; vulcanized fiber; papers; treated versions thereof; and combinations of two or more of these materials.

Fabric backings can be made from any known fibers, whether natural, synthetic or a blend of natural and synthetic fibers. Examples of useful fiber materials include fibers or yarns comprising polyester (for example, polyethylene terephthalate), polyamide (for example, hexamethylene adipamide, polycaprolactam), polypropylene, acrylic (formed from a polymer of acrylonitrile), cellulose acetate, polyvinylidene chloride-vinyl chloride copolymers, vinyl chloride-acrylonitrile copolymers, graphite, polyimide, silk, cotton, linen, jute, hemp, or rayon. Useful fibers may be of virgin materials or of recycled or waste materials reclaimed from garment cuttings, carpet manufacturing, fiber manufacturing, or textile processing, for example. Useful fibers may be homogenous or a composite such as a bicomponent fiber (for example, a co-spun sheath-core fiber). The fibers may be tensilized and crimped, but may also be continuous filaments such as those formed by an extrusion process.

The backing may have any suitable basis weight; typically, in a range of from 25 to 1250 grams per square meter (gsm), more typically 25 to 300 gsm, and even more typically 25 to 275 gsm. In many embodiments (e.g., abrasive belts and sheets), the backing typically has good flexibility; however, this is not a requirement (e.g., vulcanized fiber discs). To promote adhesion of binder resins to the backing, one or more surfaces of the backing may be modified by known methods including corona discharge, ultraviolet light exposure, electron beam exposure, flame discharge, and/or scuffing.

Optionally, backings used in coated abrasive articles may be treated with one or more applied coatings. Examples of typical backing treatments are a backsize layer (i.e., a coating on the major surface of the backing opposite the abrasive layer), a presize layer or a tie layer (i.e., a coating on the backing disposed between the abrasive layer and the backing), and/or a saturant that saturates the backing. A subsize is similar to a saturant, except that it is applied to a previously treated backing. Additional details regarding backing treatments can be found in, for example, U.S. Pat. No. 5,108,463 (Buchanan et al.); U.S. Pat. No. 5,137,542 (Buchanan et al.); U.S. Pat. No. 5,328,716 (Buchanan); and U.S. Pat. No. 5,560,753 (Buchanan et al.), the disclosures of which are incorporated herein by reference.

In a second step, a precursor make layer is disposed on the first major surface of the backing. The precursor make layer may be applied by any known coating method for applying a make layer to a backing such as, for example, including roll coating, extrusion die coating, curtain coating, knife coating, gravure coating, and spray coating.

The basis weight of the precursor make layer, and resulting make layer may depend, for example, on the intended use(s), type(s) of abrasive particles, and nature of the coated abrasive article being prepared, but typically will be in the range of from 1, 2, 5, 10, or 15 grams per square meter (gsm) to 20, 25, 100, 200, 300, 400, or even 600 gsm. The precursor make layer may be applied by any known coating method for applying a precursor make layer (e.g., a make coat) to a backing, including, for example, roll coating, extrusion die coating, curtain coating, knife coating, gravure coating, and spray coating.

The precursor make layer comprise components comprising a) 50 to 97.99 percent by weight (preferably 50 to 89.99 percent by weight) of phenol-formaldehyde resin; b) 1 to 49 percent by weight (preferably 5 to 25 percent by weight) of resorcinol-formaldehyde resin; c) 1 to 49 percent by weight (preferably 5 to 30 percent by weight) of at least one compound having at least one free-radically polymerizable group; d) 0.01 to 1 percent by weight of a free-radical initiator; and e) optional filler, wherein the percent by weight of the components a) to d) is based on the combined weight of the components a) to d).

Examples of suitable phenol-formaldehyde resins (commonly termed "phenolic resins") include resole and novolac resins. Resole phenolic resins have a molar ratio of formaldehyde to phenol, of greater than or equal to one, typically 1.5 to 3.0. Novolac resins have a molar ratio of formaldehyde to phenol of less than one to one. One preferred phenol-formaldehyde resin has a formaldehyde to phenol molar ratio of 1.5 to 2.1.

The phenolic resin is preferably a resole phenolic resin, or at least a formaldehyde containing phenolic resin. Alkaline catalysts suitable for catalyzing the reaction between aldehyde and phenolic components of resole phenolic resins include sodium hydroxide, barium hydroxide, potassium hydroxide, calcium hydroxide, organic amines, and sodium carbonate, all as solutions of the catalyst dissolved in water.

Resole phenolic resins are typically coated as a solution with water and/or organic solvent (e.g., alcohol). Typically, the solution includes about 50 percent to about 85 percent solids by weight, although other concentrations may be used. If the solids content is very low, then more energy is required to remove the water and/or solvent. If the solids content is very high, then the viscosity of the resulting phenolic resin is too high which typically leads to processing problems.

Phenolic resins are well-known and readily available from commercial sources. Examples of commercially available resole phenolic resins useful in practice of the present disclosure include those marketed by Durez Corporation under the trade designation VARCUM (e.g., 29217, 29306, 29318, 29338, 29353); those marketed by Ashland Chemical Co. of Bartow, Florida under the trade designation AEROFENE (e.g., AEROFENE 295); and those marketed by Kangnam Chemical Company Ltd. of Seoul, South Korea under the trade designation PHENOLITE (e.g., PHENOLITE TD-2207).

A general discussion of phenolic resins and their manufacture is given in Kirk-Othmer, *Encyclopedia of Chemical Technology,* 4th Ed., John Wiley and Sons, 1996, New York, Vol. 18, pp. 603-644.

Resorcinol-formaldehyde resins can be described by the chemical structure:

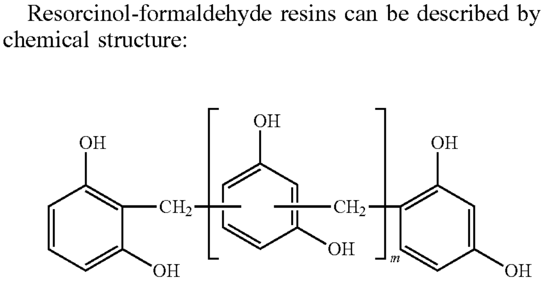

wherein m is a positive integer greater than or equal to one, or in the case of mixtures m may be a positive number greater than one. The resorcinol-formaldehyde resin is preferably a novolac resorcinol-formaldehyde resin. Exemplary resorcinol-formaldehyde resins include those available from Sumitomo Chemical Advanced Technologies, Phoenix, Arizona, under the trade designation PENACOLITE such as, for example, PENACOLITE R 20, PENACOLITE R 50, PENACOLITE R 2120, PENACOLITE R 2170, and PENACOLITE R 2200. One preferred resorcinol-formaldehyde resin is available as PENACOLITE R 50.

The present inventors unexpectedly discovered that adding resorcinol-formaldehyde resin to a precursor make layer comprising resole phenolic resin and a compound having at least one free-radically polymerizable group enhances its tackiness (especially after optional polymerization of the free-radically polymerizable component) such that abrasive particles adhere more strongly and retain their orientation better throughout the manufacturing process. Without wishing to be bound by theory, the present inventors believe that extra OH groups introduced by the resorcinol-formaldehyde relative to the phenolic resin alone results in stronger inter- and intra-molecular hydrogen bonding, and also increases the capability of holding moisture in the resin.

Examples of suitable compounds having at least one free-radically polymerizable group include compounds having at least one free-radically polymerizable group selected from (meth)acrylates, (meth)acrylamides, other vinyl compounds, and combinations thereof. Useful free-radically polymerizable compounds may comprise an ethylenically-unsaturated compound having one or more (e.g., one, two, three, four, or more) free-radically polymerizable groups.

Exemplary monomers having one free-radically polymerizable group include (meth)acrylamide, (meth)acrylic acid, (meth)acrylonitrile, 2-(2-ethoxyethoxy)ethyl (meth)acrylate, 2-ethylhexyl (meth)acrylate, 2-hydroxyethyl (meth)acrylate, tetrahydrofurfuryl (meth)acrylate, N,N-dimethylaminoethyl (meth)acrylate, 2-phenoxyethyl (meth)acrylate, 2-phenylethyl (meth)acrylate, caprolactone acrylate, cyclohexyl (meth)acrylate, dodecyl (meth)acrylate, ethoxylated phenoxyethyl (meth)acrylate, ethoxylated tetrahydrofurfuryl (meth)acrylate, hexyl (meth)acrylate, hydroxybutyl (meth)acrylate, hydroxyethyl (meth)acrylate, hydroxyisobutyl (meth)acrylate, hydroxyisopropyl (meth)acrylate, hydroxymethyl (meth)acrylate, hydroxypropyl (meth)acrylate, isobornyl (meth)acrylate, isobutyl (meth)acrylate, isodecyl (meth)acrylate, isononyl (meth)acrylate, isooctyl (meth)acrylate, lauryl (meth)acrylate, methyl (meth)acrylate, N-(n-dodecyl) (meth)acrylamide, N-(n-octadecyl) (meth)acrylamide, N-(tert-octyl) (meth)acrylamide, n-butyl (meth)acrylate, n-decyl (meth)acrylate, n-dodecyl (meth)acrylate, n-hexyl (meth)acrylate, n-octyl (meth)acrylate, nonylphenol ethoxylate (meth)acrylate, N-substituted (meth)acrylamide, N-vinyl-2-pyrrolidone, N-vinylcaprolactam, 2-vinylpyridine, 4-vinylpyridine, octyl (meth)acrylate, phenyl (meth)acrylate, stearyl (meth)acrylate, styrene and substituted styrenes, α-olefins (e.g., ethylene, propylene, butene, 1-hexene, and 1-octene), t-amyl (meth)acrylate, t-butyl (meth)acrylate, tetrahydrofurfuryl (meth)acrylate, tridecyl (meth)acrylate, undecyl (meth)acrylate, benzyl (meth)acrylate, vinyl esters (e.g., vinyl acetate and butyl acetate), vinyl ethers (e.g., ethyl vinyl ether, propyl vinyl ether, butyl vinyl ether), vinyl chloride, vinylidene dichloride, vinyltoluene, β-carboxyethyl (meth)acrylate, 2-ethylhexyl (meth)acrylate, 2-phenoxyethyl (meth)acrylate, benzyl (meth)acrylate, 2-phenylethyl (meth)acrylate, $C_2$-$C_{18}$ alkyl vinyl ethers, cyclohexyl (meth)acrylate, dodecyl (meth)acrylate, eicosyl (meth)acrylate, ethyl (meth)acrylate, heneicosyl (meth)acrylate, heptadecyl (meth)acrylate, hexadecyl (meth)acrylate, hexyl (meth)acrylate, isobornyl (meth) acrylate, isobutyl (meth)acrylate, isodecyl (meth)acrylate, isononyl (meth)acrylate, isooctyl (meth)acrylate, lauryl (meth)acrylate, methyl (meth)acrylate, N-(n-dodecyl) (meth)acrylamide, N-(tert-octyl) (meth)acrylamide, n-butyl (meth)acrylate, n-decyl (meth)acrylate, n-decyl (meth)acrylate, n-dodecyl (meth)acrylate, n-hexyl (meth)acrylate, n-octyl (meth)acrylate, nonadecyl (meth)acrylate, nonylphenol ethoxylate (meth)acrylate, octyl (meth)acrylate, pentadecyl (meth)acrylate, phenyl (meth)acrylate, stearyl (meth) acrylate, dimethylaminoethyl methacrylate, styrene and substituted styrenes (e.g., styrene, α-methylstyrene, 4-t-butylstyrene, and 4-chloromethylstyrene), t-amyl (meth) acrylate, t-butyl (meth)acrylate, tetradecyl (meth)acrylate, tetrahydrofurfuryl (meth)acrylate, tridecyl (meth)(meth) acrylate), and undecyl (meth)acrylate. Examples of suitable (meth)acrylates having more than one free-radically polymerizable group include di-, and poly-(meth)acrylates and (meth)acrylamides such as, for example, 1,2,4-butanetriol tri(meth)acrylate, 1,3-butylene glycol di(meth)acrylate, 1,3-propanediol di(meth)acrylate, 1,4-butanediol di(meth)acrylate, 1,4-cyclohexanediol di(meth)acrylate, 1,6-hexanediol di(meth)acrylate, 1,6-hexanediol monomethacrylate monoacrylate, alkoxylated cyclohexanedimethanol di(meth)acrylates, alkoxylated hexanediol di(meth)acrylate, alkoxylated neopentyl glycol di(meth)acrylate, bis[1-(2-(meth)acryloxy)]-p-ethoxy-phenyldimethylmethane, bis[1-(3-(meth) acryloxy-2-hydroxy)]-p-propoxyphenyldimethylmethane, caprolactone modified dipentaerythritol hexa(meth)acrylate, caprolactone modified neopentyl glycol hydroxypivalate di(meth)acrylate, cyclohexanedimethanol di(meth)acrylate, diethylene glycol di(meth)acrylate, dipentaerythritol penta (meth)acrylate, dipropylene glycol di(meth)acrylate, ditrimethylolpropane tetra(meth)acrylate, ethoxylated (10) bisphenol A di(meth)acrylate, ethoxylated (20) trimethylolpropane tri(meth)acrylate, ethoxylated (3) bisphenol A di(meth)acrylate, ethoxylated (3) trimethylolpropane tri(meth)acrylate, ethoxylated (30) bisphenol A di(meth)acrylate, ethoxylated (4) bisphenol A di(meth)acrylate, ethoxylated (4) pentaerythritol tetra(meth)acrylate, ethoxylated (6) trimethylolpropane tri(meth)acrylate, ethoxylated (9) trimethylolpropane tri(meth)acrylate, ethoxylated bisphenol A di(meth) acrylate, ethylene glycol di(meth)acrylate, glycerol tri(meth) acrylate, hydroxypivalaldehyde modified trimethylolpropane di(meth)acrylate, neopentyl glycol di(meth)acrylate, pentaerythritol tetra(meth)acrylate, pentaerythritol tri(meth)acrylate, polyethylene glycol (200) di(meth)acrylate, polyethylene glycol (400) di(meth)acrylate, polyethylene glycol (600) di(meth)acrylate, propoxylated (3) glyceryl tri(meth)acrylate, propoxylated (3) trimethylolpropane tri(meth)acrylate, propoxylated (5.5) glyceryl tri(meth)acrylate, propoxylated (6) trimethylolpropane tri(meth)acrylate), propoxylated neopentyl glycol di(meth)acrylate, sorbitol hexa(meth)acrylate, tetraethylene glycol di(meth)acrylate, tricyclodecanedimethanol di(meth) acrylate, triethylene glycol di(meth)acrylate, trimethylolpropane tri(meth)acrylate, tripropylene glycol di(meth)acrylate, tris(2-hydroxyethyl)isocyanurate tri(meth)acrylate, methylene bis(meth)acrylamide, and poly(ethylenically-unsaturated) carbamoyl isocyanurates such as those disclosed in U.S. Pat. No. 4,648,843 (Mitra).

Examples of suitable free-radically polymerizable vinyl compounds include diallyl phthalate, divinyl succinate, divinyl adipate, and divinyl phthalate.

Suitable free-radically polymerizable compounds are available from a wide variety of commercial sources such as, for example, Sartomer Co., Exton, Pennsylvania, or can be made by known methods.

If desired, water, organic solvent, and/or monofunctional free-radically polymerizable compound(s) can be addition to the precursor make layer; for example, to reduce coating viscosity. Examples of monofunctional free-radically polymerizable compounds include 2-phenoxyethyl (meth) acrylate, allyl (meth)acrylate, ethyl (meth)acrylate, 2-ethylhexyl (meth)acrylate, isobornyl (meth)acrylate, isopropyl (meth)acrylate, methyl (meth)acrylate, n-hexyl (meth)acrylate, stearyl (meth)acrylate, tetrahydrofurfuryl (meth)acrylate, (meth)acrylamide, N,N-dimethylacrylamide, N-vinylpyrrolidone, and N-vinylcaprolactam.

Useful free-radical initiators (i.e., initiators of free-radical polymerization) may include thermal free-radical initiators and photoinitiators.

Exemplary free-radical thermal initiators include azo compounds (such as 2,2'-azobisisobutyronitrile (AIBN), 2,2'-azobis(2-methylbutyronitrile), 2,2'-azobis(2,4-dimethylvaleronitrile), and peroxide compounds (such as benzoyl peroxide or lauroyl peroxide) can be used. Heat sources such as, for example, hot rolls, ovens, and heat lamps may be used to decompose any thermal initiator if present.

Useful free-radical photoinitiators include those known as useful for photocuring free-radically polyfunctional (meth) acrylates. Exemplary free-radical photoinitiators include benzoin and its derivatives such as α-methylbenzoin; α-phenylbenzoin; α-allylbenzoin; α-benzylbenzoin; benzoin ethers such as benzil dimethyl ketal benzoin methyl ether, benzoin ethyl ether, benzoin n-butyl ether; acetophenone and its derivatives such as 2-hydroxy-2-methyl-1-phenyl-1-propanone and 1-hydroxycyclohexyl phenyl ketone; 2-methyl-1-[4(methylthio)phenyl]-2-(4-morpholinyl)-1-propanone; 2-benzyl-2-(dimethlamino)-1-[4-(4-morpholinyl)phenyl]-1-butanone.

Other useful free-radical photoinitiators include pivaloin ethyl ether, anisoin ethyl ether; anthraquinones, such as anthraquinone, 2-ethylanthraquinone, 1-chloroanthraquinone, 1,4-dimethylanthraquinone, and 1-methoxyanthraquinone; benzophenone and its derivatives; iodonium salts and sulfonium salts as described hereinabove; titanium complexes such as bis([eta]5-2,4-cyclopentadien-1-yl)bis[2,6-difluoro-3-(1H-pyrrol-1-yl)phenyl]titanium; mono- and bis-acylphosphines and phosphine oxides (e.g., as available as OMNIRAD TPO, OMNIRAD TPO-L1800, and OMNIRAD 819 from IGM resins, Waalwijk, The Netherlands.

Suitable sources of actinic radiation for decomposing the photoinitiators are well known in the art and may include, for example, lasers, xenon flashlamps, microwave driven lamps having H-Type or D-Type bulbs, and medium pressure mercury arc lamps, and Light Emitting Diode (LED) lamps.

The precursor make layer may optionally contain filler materials, diluent abrasive particles (e.g., as described hereinbelow), or grinding aids, typically in the form of a particulate material. Typically, the particulate materials are inorganic materials. Examples of useful fillers for this disclosure include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite). If present, the amount of filler may be up to 10, 20, 30, 40, or even up to 50 percent, or more.

A grinding aid is a material that has a significant effect on the chemical and physical processes of abrading, which results in improved performance. Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphthalene, pentachloronaphthalene, and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metals include tin, lead, bismuth, cobalt, antimony, cadmium, iron, and titanium.

Other miscellaneous grinding aids include sulfur, organic sulfur compounds, graphite, and metallic sulfides. A combination of different grinding aids may be used, and in some instances, this may produce a synergistic effect.

The precursor make layer may also contain additives such as fibers, lubricants, wetting agents, surfactants, pigments, dyes, antistatic agents (e.g., carbon black, vanadium oxide, and/or graphite), coupling agents (e.g., silanes, titanates, and/or zircoaluminates), plasticizers, suspending agents, and the like. The amounts of these optional additives are selected to provide the preferred properties.

After coating the precursor make layer onto a major surface of the backing, it is optionally (but preferably) heated and/or irradiated with actinic radiation to cause polymerization of the free-radically polymerizable compound(s). This process partially cures the precursor make layer, and helps to preserve orientation of the abrasive particles when they are deposited.

The abrasive particles may be deposited on the precursor make layer (whether partially cured or not) by any method known in the abrasive arts, for example. Examples include drop coating, electrostatic coating, magnetic coating, and transfer from a production tool as described in U.S. Pat. No. 10,611,001 (Adefris et al.) and 9776302 (Keipert).

Useful abrasive particles may be the result of a crushing operation (e.g., crushed abrasive particles that have been sorted for shape and size) or the result of a shaping operation (i.e., shaped abrasive particles) in which an abrasive precursor material is shaped (e.g., molded), dried, and converted to ceramic material. Combinations of abrasive particles resulting from crushing with abrasive particles resulting from a shaping operation may also be used. The abrasive particles may be in the form of, for example, individual particles, agglomerates, composite particles, and mixtures thereof.

The abrasive particles should have sufficient hardness and surface roughness to function as crushed abrasive particles in abrading processes. Preferably, the abrasive particles have a Mohs hardness of at least 4, at least 5, at least 6, at least 7, or even at least 8.

Suitable abrasive particles include, for example, crushed abrasive particles comprising fused aluminum oxide, heat-treated aluminum oxide, white fused aluminum oxide, ceramic aluminum oxide materials such as those commercially available as 3M CERAMIC ABRASIVE GRAIN from 3M Company, St. Paul, Minnesota, brown aluminum oxide, blue aluminum oxide, silicon carbide (including green silicon carbide), titanium diboride, boron carbide, tungsten carbide, garnet, titanium carbide, diamond, cubic boron nitride, garnet, fused alumina zirconia, iron oxide, chromia, zirconia, titania, tin oxide, quartz, feldspar, flint, emery, sol-gel-derived ceramic (e.g., alpha alumina), and combinations thereof. Examples of sol-gel-derived abrasive particles from which the abrasive particles can be isolated, and methods for their preparation can be found, in U.S. Pat. No. 4,314,827 (Leitheiser et al.); U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.). It is also contemplated that the abrasive particles could comprise abrasive agglomerates such, for example, as those described in U.S. Pat. No. 4,652,275 (Bloecher et al.) or U.S. Pat. No. 4,799,939 (Bloecher et al.). In some embodiments, the abrasive particles may be surface-treated with a coupling agent (e.g., an organosilane coupling agent) or other physical treatment (e.g., iron oxide or titanium oxide) to enhance adhesion of the crushed abrasive particles to the binder. The abrasive particles may be treated before combining them with the binder, or they may be surface treated in situ by including a coupling agent to the binder.

Preferably, the abrasive particles (and especially the abrasive particles) comprise ceramic abrasive particles such as, for example, sol-gel-derived polycrystalline alpha alumina particles. Ceramic abrasive particles composed of crystallites of alpha alumina, magnesium alumina spinel, and a rare earth hexagonal aluminate may be prepared using sol-gel precursor alpha alumina particles according to methods described in, for example, U.S. Pat. No. 5,213,591 (Celikkaya et al.) and U.S. Publ. Pat. Appln. Nos. 2009/0165394 A1 (Culler et al.) and 2009/0169816 A1 (Erickson et al.). Further details concerning methods of making sol-gel-derived abrasive particles can be found in, for example, U.S. Pat. No. 4,314,827 (Leitheiser); U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.); and in U.S. Publ. Pat. Appln. No. 2009/0165394 A1 (Culler et al.).

In some preferred embodiments, useful abrasive particles (especially in the case of the abrasive particles) may be shaped abrasive particles can be found in U.S. Pat. No. 5,201,916 (Berg); U.S. Pat. No. 5,366,523 (Rowenhorst (Re 35,570)); and U.S. Pat. No. 5,984,988 (Berg). U.S. Pat. No. 8,034,137 (Erickson et al.) describes alumina abrasive particles that have been formed in a specific shape, then crushed to form shards that retain a portion of their original shape features. In some embodiments, the abrasive particles are precisely-shaped (i.e., the particles have shapes that are at least partially determined by the shapes of cavities in a production tool used to make them. Details concerning such abrasive particles and methods for their preparation can be found, for example, in U.S. Pat. No. 8,142,531 (Adefris et al.); U.S. Pat. No. 8,142,891 (Culler et al.); U.S. Pat. No. 8,142,532 (Erickson et al.); U.S. Pat. No. 9,771,504 (Adefris); and in U.S. Pat. Appl. Publ. Nos. 2012/0227333 (Adefris et al.); 2013/0040537 (Schwabel et al.); and 2013/0125477 (Adefris). One particularly useful precisely-shaped abrasive particle shape is that of a platelet having three-sidewalls, any of which may be straight or concave, and which may be vertical or sloping with respect to the platelet base; for example, as set forth in the above cited references.

Surface coatings on the abrasive particles may be used to improve the adhesion between the abrasive particles and a binder material, or to aid in electrostatic deposition of the abrasive particles. In one embodiment, surface coatings as described in U.S. Pat. No. 5,352,254 (Celikkaya) in an amount of 0.1 to 2 percent surface coating to abrasive particle weight may be used. Such surface coatings are described in U.S. Pat. No. 5,213,591 (Celikkaya et al.); U.S. Pat. No. 5,011,508 (Wald et al.); U.S. Pat. No. 1,910,444 (Nicholson); U.S. Pat. No. 3,041,156 (Rowse et al.); U.S. Pat. No. 5,009,675 (Kunz et al.); U.S. Pat. No. 5,085,671 (Martin et al.); U.S. Pat. No. 4,997,461 (Markhoff-Matheny et al.); and U.S. Pat. No. 5,042,991 (Kunz et al.). Additionally, the surface coating may prevent shaped abrasive particles from capping. Capping is the term to describe the phenomenon where metal particles from the workpiece being abraded become welded to the tops of the abrasive particles. Surface coatings to perform the above functions are known to those of skill in the art.

In some embodiments, the abrasive particles may be selected to have a length and/or width in a range of from 0.1 micrometers to 3.5 millimeters (mm), more typically 0.05 mm to 3.0 mm, and more typically 0.1 mm to 2.6 mm, although other lengths and widths may also be used.

The abrasive particles may be selected to have a thickness in a range of from 0.1 micrometer to 1.6 mm, more typically from 1 micrometer to 1.2 mm, although other thicknesses may be used. In some embodiments, abrasive particles may have an aspect ratio (length to thickness) of at least 2, 3, 4, 5, 6, or more.

Abrasive particles may be independently sized according to an abrasives industry recognized specified nominal grade. Exemplary abrasive industry recognized grading standards include those promulgated by ANSI (American National Standards Institute), FEPA (Federation of European Producers of Abrasives), and JIS (Japanese Industrial Standard). Such industry accepted grading standards include, for example: ANSI 4, ANSI 6, ANSI 8, ANSI 16, ANSI 24, ANSI 30, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600; FEPA P8, FEPA P12, FEPA P16, FEPA P24, FEPA P30, FEPA P36, FEPA P40, FEPA P50, FEPA P60, FEPA P80, FEPA P100, FEPA P120, FEPA P150, FEPA P180, FEPA P220, FEPA P240, FEPA P320, FEPA P400, FEPA P500, FEPA P600, FEPA P800, FEPA P1000, FEPA P1200; FEPA F8, FEPA F12, FEPA F16, and FEPA F24; and JIS 8, JIS 12, JIS 16, JIS 24, JIS 36, JIS 46, JIS 54, JIS 60, JIS 80, JIS 100, JIS 150, JIS 180, JIS 220, JIS 240, JIS 280, JIS 320, JIS 360, JIS 400, JIS 600, JIS 800, JIS 1000, JIS 1500, JIS 2500, JIS 4000, JIS 6000, JIS 8000, and JIS 10,000. More typically, the crushed aluminum oxide particles and the non-seeded sol-gel derived alumina-based abrasive particles are independently sized to ANSI 60 and 80, or FEPA F36, F46, F54 and F60 or FEPA P60 and P80 grading standards.

Alternatively, the abrasive particles can be graded to a nominal screened grade using U.S.A. Standard Test Sieves conforming to ASTM E-11 "Standard Specification for Wire Cloth and Sieves for Testing Purposes". ASTM E-11 prescribes the requirements for the design and construction of testing sieves using a medium of woven wire cloth mounted in a frame for the classification of materials according to a designated particle size. A typical designation may be represented as −18+20 meaning that the shaped abrasive particles pass through a test sieve meeting ASTM E-11 specifications for the number 18 sieve and are retained on a test sieve meeting ASTM E-11 specifications for the number 20 sieve. In one embodiment, the shaped abrasive particles have a particle size such that most of the particles pass through an 18 mesh test sieve and can be retained on a 20, 25, 30, 35, 40, 45, or 50 mesh test sieve. In various embodiments, the shaped abrasive particles can have a nominal screened grade comprising: −18+20, −20+25, −25+30, −30+35, −35+40, −40+45, −45+50, −50+60, −60+70, −70+80, −80+100, −100+120, −120+140, −140+170, −170+200, −200+230, −230+270, −270+325, −325+400, −400+450, −450+500, or −500+635. Alternatively, a custom mesh size could be used such as −90+100.

Blends of different abrasive particles may be used.

Once the abrasive particles are coated onto the precursor make layer it is further cured to a point that is at least sufficient to substantially retain the abrasive particles to the make coat throughout the rest of the manufacturing process.

At this point in some embodiments, a supersize layer is applied over the at least partially cured precursor make layer and abrasive particles. If present, the supersize layer typically has a basis weight of 5 to 1100 grams per square meter (gsm), preferably 50 to 700 gsm, and more preferably 250 to 600 gsm, although this is not a requirement.

The supersize layer may be applied neat, or out of water and/or organic solvent. In some embodiments, the supersize layer is formed by curing a precursor supersize layer. Useful precursor supersize layers can comprise urea-formaldehyde resin, phenolic resin (novolac and/or resole), epoxy resin, or a combination thereof, for example. Additional components in the supersize layer may include wax, mineral oil, grinding aid, and combinations thereof. Typically, the supersize layer also contains at least one grinding aid, however this is not a requirement.

A grinding aid is a material that has a significant effect on the chemical and physical processes of abrading, which results in improved performance. Grinding aids encompass a wide variety of different materials and can be inorganic or organic based. Examples of chemical groups of grinding aids include waxes, organic halide compounds, halide salts, metals and their alloys, and stearates and metal salts of stearates. The organic halide compounds will typically break down during abrading and release a halogen acid or a gaseous halide compound. Examples of such materials include chlorinated waxes like tetrachloronaphthalene, pentachloronaphthalene, and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metals include tin, lead, bismuth, cobalt, antimony, cadmium, iron, and titanium. Other miscellaneous grinding aids include sulfur, organic sulfur compounds, graphite, and metallic sulfides. A combination of different grinding aids may be used, and in some instances, this may produce a synergistic effect.

Figure 2:
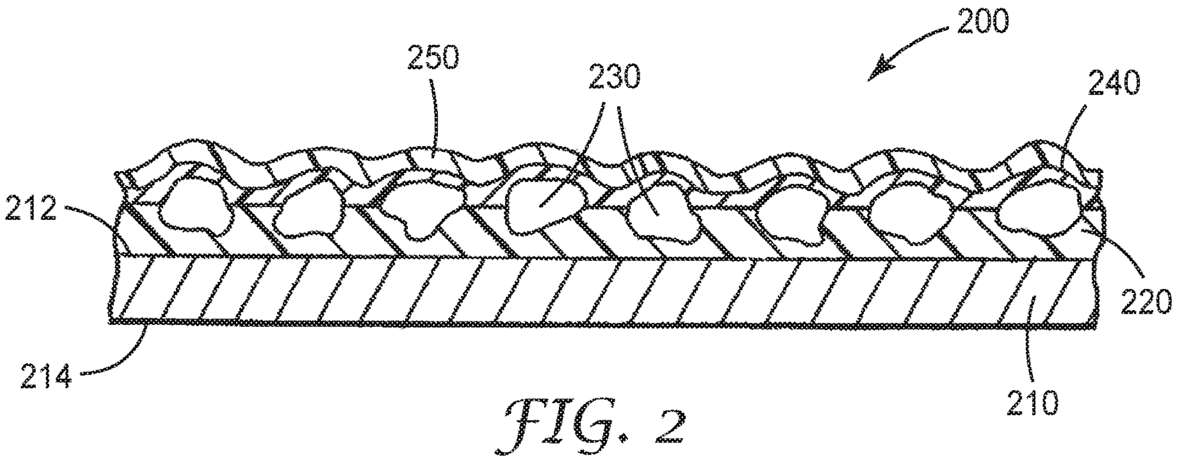
FIG. 2 is a schematic side view of an exemplary abrasive article 100 made according one method of the present disclosure.

FIG. 2 shows an exemplary abrasive article that can be prepared according embodiments of the present disclosure. Coated abrasive article 200 comprises backing 210 having first and second opposed major surfaces 212, 214 and make layer 220 disposed on first major surface 212. Abrasive particles 230 are partially embedded in and secured to make layer 220. Supersize layer 240 is disposed on make layer 220 and abrasive particles 130. Optional supersize layer 250 is disposed on size layer 240.

Coated abrasive articles as shown in FIG. 2 can be made according to the methods described hereinabove, except that the optional supersize layer 150 (see FIG. 1) is replaced with a size layer formed by disposing a precursor size layer on the make layer (precursor) and abrasive articles, at least partially curing the precursor size layer top provide a size layer, and then optionally disposing a supersize layer on top of the size layer (e.g., as described hereinabove).

The precursor size layer can be the same or different than that of the precursor make layer. Examples of precursor size layers may comprise free-radically polymerizable monomers and/or oligomers, epoxy resins, acrylic resins, urethane resins, phenolic resins, urea-formaldehyde resins, melamine-formaldehyde resins, aminoplast resins, cyanate resins, a combinations thereof.

The basis weight of the precursor size layer, and resulting size layer may depend, for example, on the intended use(s), type(s) of abrasive particle, and nature of the coated abrasive article being prepared, but typically will be in the range of from 1, 2, 5, 10, or 15 grams per square meter (gsm) to 20, 25, 100, 200, 300, 400, or even 600 gsm. The precursor make layer may be applied by any known coating method for applying a precursor make layer (e.g., a make coat) to a backing, including, for example, roll coating, extrusion die coating, curtain coating, knife coating, gravure coating, and spray coating.

Additional details concerning (precursor) size layers may be found in U.S. Pat. No. 4,588,419 (Caul et al.), U.S. Pat. No. 4,751,138 (Tumey et al.), and U.S. Pat. No. 5,436,063 (Follett et al.).

The make layer and the size layer, and their respective precursors, may also contain additives such as fibers, lubricants, wetting agents, surfactants, pigments, dyes, antistatic agents (e.g., carbon black, vanadium oxide, and/or graphite), coupling agents (e.g., silanes, titanates, and/or zircoaluminates), plasticizers, suspending agents, and the like. The amounts of these optional additives are selected to provide the preferred properties. The coupling agents can improve adhesion to the abrasive particles and/or filler. The curable composition may be thermally-cured, radiation-cured, or a combination thereof.

Coated abrasive articles according to the present disclosure may be converted, for example, into belts, rolls, discs (including perforated discs), and/or sheets. For belt applications, two free ends of the abrasive sheet may be joined together using known methods to form a spliced belt.

Further details regarding coated abrasive articles and methods of their manufacture can be found, for example, in U.S. Pat. No. 4,734,104 (Broberg); U.S. Pat. No. 4,737,163 (Larkey); U.S. Pat. No. 5,203,884 (Buchanan et al.); U.S. Pat. No. 5,152,917 (Pieper et al.); U.S. Pat. No. 5,378,251 (Culler et al.); U.S. Pat. No. 5,436,063 (Follett et al.); U.S. Pat. No. 5,496,386 (Broberg et al.); U.S. Pat. No. 5,609,706

(Benedict et al.); U.S. Pat. No. 5,520,711 (Helmin); U.S. Pat. No. 5,961,674 (Gagliardi et al.), and U.S. Pat. No. 5,975,988 (Christianson).

SELECT EMBODIMENTS OF THE PRESENT DISCLOSURE

In a first embodiment, the present disclosure provides a method of making a coated abrasive article comprising:

providing a backing having first and second opposed major surfaces;

disposing a precursor make layer on the first major surface of the backing, wherein the precursor make layer comprises an at least partially cured reaction product of components comprising:

a) 50 to 97.99 percent by weight of phenol-formaldehyde resin;

b) 1 to 49 percent by weight of resorcinol-formaldehyde resin;

c) 1 to 49 percent by weight of at least one compound having at least one free-radically polymerizable group;

d) 0.01 to 1 percent by weight of a free-radical initiator; and e) optional filler, wherein the percent by weight of the components a) to d) is based on the combined weight of the components a) to d); and optionally partially curing the precursor make layer to provide a partially cured precursor make layer; and partially embedding abrasive particles in the optionally partially cured precursor make layer; and further curing the optionally partially cured precursor make layer to provide a further cured precursor make layer.

In a second embodiment, the present disclosure provides a method according to the first embodiment, wherein the components comprise:

a) 50 to 89.99 percent by weight of the phenol-formaldehyde resin b) 5 to 25 percent by weight of the resorcinol-formaldehyde resin, c) 5 to 30 percent by weight of the at least one compound having at least one free-radically polymerizable group; and d) 0.01 to 1 percent by weight of a free-radical initiator; and e) optional filler, wherein the percent by weight of the components a) to d) is based on the combined weight of the components a) to d).

In a third embodiment, the present disclosure provides a method according to the first or second embodiment, wherein the free-radical initiator comprises a free-radical photoinitiator.

In a fourth embodiment, the present disclosure provides a method according to any of the first to third embodiments, wherein the filler is present.

In a fifth embodiment, the present disclosure provides a method according to any of the first to fourth embodiments, further comprising disposing a supersize layer on the further cured precursor make layer and the abrasive particles.

In a sixth embodiment, the present disclosure provides a method according to any of the first to fourth embodiments, further comprising:

disposing precursor size layer on the further cured precursor make layer and the abrasive particles; and at least partially curing the precursor size layer to provide an at least partially cured size layer.

In a seventh embodiment, the present disclosure provides a method according to the sixth embodiment, further comprising disposing a supersize layer on the at least partially cured size layer.

In an eighth embodiment, the present disclosure provides a coated abrasive article made by the method of the first embodiment.

In a ninth embodiment, the present disclosure provides a coated abrasive article made by the method of the second embodiment.

In a tenth embodiment, the present disclosure provides a coated abrasive article made by the method of the third embodiment.

In an eleventh embodiment, the present disclosure provides a coated abrasive article made by the method of the fourth embodiment.

In a twelfth embodiment, the present disclosure provides a coated abrasive article made by the method of the fifth embodiment.

In a thirteenth embodiment, the present disclosure provides a coated abrasive article made by the method of the sixth embodiment.

In a fourteenth embodiment, the present disclosure provides a coated abrasive article made by the method of the seventh embodiment.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless stated otherwise, all other reagents were obtained, or are available from fine chemical vendors such as Sigma-Aldrich Company, St. Louis, Missouri, or may be synthesized by known methods. Table 1, below, reports abbreviations and materials used in the Examples.

Unit Abbreviations used in the Examples: ° C.=degrees Celsius; cm=centimeter; mm=millimeter; Bm=micrometer; kV=kilovolts; mJ/$cm^2$=millijoules per square centimeter.

TABLE 1

| ABBREVIATION | MATERIAL |
|---|---|
| PFR | Phenol-formaldehyde resin, 75% solids in water, having a phenol to formaldehyde molar ratio of 1:1.5-2.1, and catalyzed with 2.5 percent by weight potassium hydroxide. |
| CACO | Calcium carbonate commercially available as HUBERCARB Q325 from Hubercarb Engineered Materials, Atlanta Georgia. |
| RNR | Resorcinol-formaldehyde novolac resin, 50% solids in water, commercially available as PENACOLITE RESIN R-50 from Sumitomo Chemical America, Inc., New York, New York. |
| TMPTA | Trimethylolpropane triacrylate from Sartomer USA, LLC., Exton, Pennsylvania. |
| BDK | 2,2-dimethoxy-2-phenylacetophenone obtained as OMNIRAD 651 from IGM Resins USA Inc., Charlotte, North Carolina. |
| MR1 | Make resin 1, prepared by mixing 50.98 parts by weight of PFR, 5.66 parts by weight of RNR, 5.32 parts by weight of TMPTA, 0.05 parts by weight of BDK, 35.71 parts by weight of CACO, |

TABLE 1-continued

| ABBREVIATION | MATERIAL |
|---|---|
| | and 2.27 parts by weight of deionized water. |
| MR2 | Make resin 2, prepared by mixing 56.64 parts by weight of PFR, 5.32 parts by weight of TMPTA, 0.05 parts by weight of BDK, 35.71 parts by weight of CACO, and 2.27 parts by weight of deionized water. |
| PRB | Paper backing having a basis weight of 244-256 gram per square meter, obtained as NODUST B-250-VSNATURAL from Munksjo Paper Inc., Stockholm, Sweden. |
| PET | 3 mil (76.2 microns) thickness PET film backing with 20 microns ethylene acrylic acid primer obtained from 3M Company, St. Paul, Minnesota, made from thermally extruded, biaxially stretched, polyethylene terephthalate (PET) resin. |
| SAP | Shaped abrasive particles, prepared according to the disclosure of U. S. Pat. No. 8,142,531 (Adefris et al.). The SAP used in the examples were about 0.52 mm (side length) × 0.15 mm (thickness), with a draft angle approximately 98 degrees. |

Example 1

This example was made according to the following procedure: (1) 1.5 gram of SAP was uniformly dispersed on a 4 inches×8 inches (10.16 cm×20.32 cm) mineral bed. (2) MR1 was knife coated on the coat side (Paul N. Gardner Co., Pompano Beach, Florida) of PRB at a 4-mil (102-micron) gap with an area slightly larger than the mineral bed. (3) PRB was placed on a conveyer at 30 feet (9.1 m) per minute with the MR1 coating facing up and passed through a FUSION UV Systems (Gaithersburg, Maryland) UV processor equipped with an H-type bulb. Ultraviolet (UV) light dosage was: UVA—242 mJ/cm$^2$; UVB—167 mJ/cm$^2$; UVC—53 mJ/cm$^2$; UVV—mJ/cm$^2$.

(4) PRB was then placed right above the mineral bed with the coat side facing down to the minerals. The gap between PRB and the mineral bed was about 1 inch (2.54 cm). (5) Abrasive particles were coated on the MR1 layer electrostatically using a 15-17 kV direct current electric field. (6) The coated article was placed in an oven at 90° C. for 30 minutes before mineral coating analysis.

Comparative Example A

This example was made according to the procedure described in EXAMPLE 1, except that MR2 was used in step (2) instead of MR1.

Example 2

This example was made through the following steps: (1) 1.5 gram of SAP was uniformly dispersed on a 4 inches×8 inches (10.16 cm×20.32 cm) mineral bed. (2) MR1 was knife coated on the primer side of PET at a 4-mil (102-micron) gap with an area slightly larger than the mineral bed. (3) PRB was placed on a conveyer at 30 feet (9.1 m) per minute with the MR1 coating facing up and passed through a FUSION UV Systems UV processor equipped with an H-type bulb. Ultraviolet (UV) light dosage was: UVA—242 mJ/cm$^2$; UVB—167 mJ/cm$^2$; UVC—53 mJ/cm$^2$; UVV—mJ/cm$^2$.

(4) PET was then placed right above the mineral bed with the coat side facing down to the minerals. The gap between PET and the mineral bed is about 1 inch (2.54 cm). (5) Minerals were coated on the MR1 layer electrostatically in a 15-17 kV direct current electric field. (6) The coated sample was placed in an oven at 90° C. for 30 minutes before mineral coating analysis.

Comparative Example B

This example was made generally according to the procedure described in EXAMPLE 2, except MR2 was used in step (2) instead of MR1.

Mineral Coating Analysis

For EXAMPLES 1 and 2 and COMPARATIVE EXAMPLES A and B, abrasive particles left on the mineral bed was weighed after coating to determine the amount of abrasive particles (i.e., mineral) picked up and incorporated into the coated abrasive article. Results of mineral pickup are reported in Table 2, below, reports mineral pickup.

TABLE 2

| | EXAMPLE 1 | COMPARATIVE EXAMPLE A | EXAMPLE 2 | COMPARATIVE EXAMPLE B |
|---|---|---|---|---|
| Initial weight on the bed, grams | 1.50 | 1.50 | 1.50 | 1.50 |
| Weight of mineral left, grams | 1.04 | 1.25 | 0.51 | 0.70 |
| Mineral coating weight, grams | 0.46 | 0.25 | 0.99 | 0.80 |
| Mineral pickup ratio, grams | 0.31 | 0.17 | 0.66 | 0.53 |

Images were taken with a Keyence microscope for mineral density and orientation analysis. The image zoom-in areas were 11.830 mm×8.877 mm for density calculation. For example, peak density is equal to peak count in the image divided by zoom-in area. For peak count analysis, only SAP with integral triangular shape were considered. Peaks are defined as SAP standing up with the dihedral angle to the backing larger than 45°, while SAP with the dihedral angle smaller than 45° are considered lying down. Mineral orientation ratio was calculated as peak density divided by SAP density. Results are reported in Table 3, below.

TABLE 3

| | PEAK DENSITY, peaks/mm$^2$ | SAP DENSITY, particles/mm$^2$ | ORIENTATION RATIO, percent |
|---|---|---|---|
| EXAMPLE 1 | 1.40 | 2.10 | 66.5 |
| COMPARATIVE EXAMPLE A | 0.10 | 0.80 | 13.1 |
| EXAMPLE 2 | 1.81 | 2.15 | 84.1 |
| COMPARATIVE EXAMPLE B | 0.15 | 1.45 | 10.5 |

All cited references, patents, and patent applications in this application are incorporated by reference in a consistent manner. In the event of inconsistencies or contradictions between portions of the incorporated references and this application, the information in this application shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of making a coated abrasive article, the method comprising:

providing a backing having first and second opposed major surfaces;

disposing a precursor make layer on the first major surface of the backing, wherein the precursor make layer comprises an at least partially cured reaction product of components comprising:

a) 50 to 97.99 percent by weight of phenol-formaldehyde resin;

b) 1 to 49 percent by weight of resorcinol-formaldehyde resin;

c) 1 to 49 percent by weight of at least one compound having at least one free-radically polymerizable group;

d) 0.01 to 1 percent by weight of a free-radical initiator; and e) optionally, a filler, wherein the percent by weight of the components a) to d) is based on the combined weight of the components a) to d); and optionally partially curing the precursor make layer to provide a partially cured precursor make layer; and partially embedding abrasive particles in the optionally partially cured precursor make layer; and further curing the optionally partially cured precursor make layer to provide a further cured precursor make layer.

2. The method of claim 1, wherein the components comprise:

a) 50 to 89.99 percent by weight of the phenol-formaldehyde resin;

b) 5 to 25 percent by weight of the resorcinol-formaldehyde resin;

c) 5 to 30 percent by weight of the at least one compound having at least one free-radically polymerizable group; and d) 0.01 to 1 percent by weight of a free-radical initiator; and e) optionally, a filler, wherein the percent by weight of the components a) to d) is based on the combined weight of the components a) to d).

3. The method of claim 1, wherein the free-radical initiator comprises a free-radical photoinitiator.

4. The method of claim 1, wherein the filler is present.

5. The method of claim 1, further comprising disposing a supersize layer on the further cured precursor make layer and the abrasive particles.

6. The method of claim 1, further comprising:

disposing a precursor size layer on the further cured precursor make layer and the abrasive particles; and at least partially curing the precursor size layer to provide an at least partially cured size layer.

7. The method of claim 6, further comprising disposing a supersize layer on the at least partially cured size layer.

8. A coated abrasive article made by the method of claim 1.

9. A coated abrasive article made by the method of claim 2.

10. A coated abrasive article made by the method of claim 3.

11. A coated abrasive article made by the method of claim 4.

12. A coated abrasive article made by the method of claim 5.

13. A coated abrasive article made by the method of claim 6.

14. A coated abrasive article made by the method of claim 7.

* * * * *